United States Patent [19]

Livingston

[11] Patent Number: 4,526,548

[45] Date of Patent: Jul. 2, 1985

[54] MOBILE FIREFIGHTER TRAINING EQUIPMENT

[75] Inventor: Arnold M. Livingston, Millington, N.J.

[73] Assignee: Tifa Limited, Millington, N.J.

[21] Appl. No.: 667,030

[22] Filed: Nov. 1, 1984

[51] Int. Cl.³ .............................................. G09B 9/00
[52] U.S. Cl. .................................................. 434/226
[58] Field of Search ......................................... 434/226

[56] References Cited

U.S. PATENT DOCUMENTS

| | | | |
|---|---|---|---|
| 3,071,872 | 1/1963 | Hart | 434/226 |
| 3,675,342 | 7/1972 | Wolff | 434/226 |
| 3,675,343 | 7/1972 | Swiatosz et al. | 434/226 |
| 4,001,949 | 1/1977 | Francis | 434/226 |
| 4,299,579 | 11/1981 | Swiatosz et al. | 434/226 |
| 4,303,396 | 12/1981 | Swiatosz | 434/226 |
| 4,303,397 | 12/1981 | Swiatosz | 434/226 |

Primary Examiner—William H. Grieb
Attorney, Agent, or Firm—Sughrue, Mion, Zinn, Macpeak and Seas

[57] ABSTRACT

A mobile firefighter training trailer is divided into a plurality of rooms and passages. A plurality of simulated appliances and furniture pieces are located in the various rooms of the trailer. A smoke generator is located in a separate equipment room in the trailer and is capable of selectively supplying smoke to desired locations in the trailer. Flame generating devices are associated with the simulated appliances and furniture pieces with the flames created thereby being capable of being extinguished by the proper application of water or other extinguishing agents. A ventilation system and sprinkler system are provided for the safety of the trainee.

4 Claims, 5 Drawing Figures

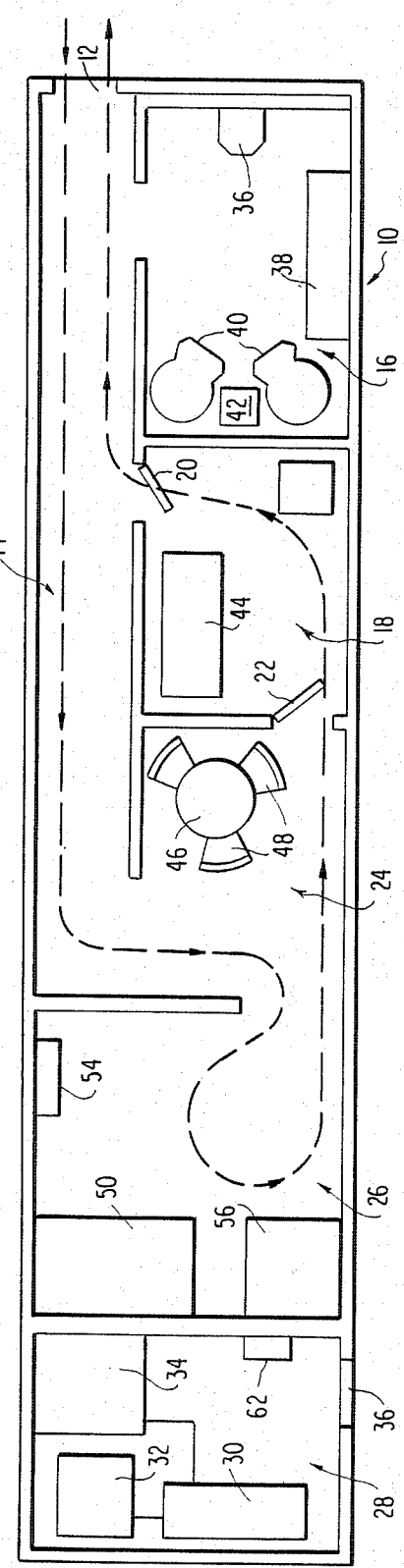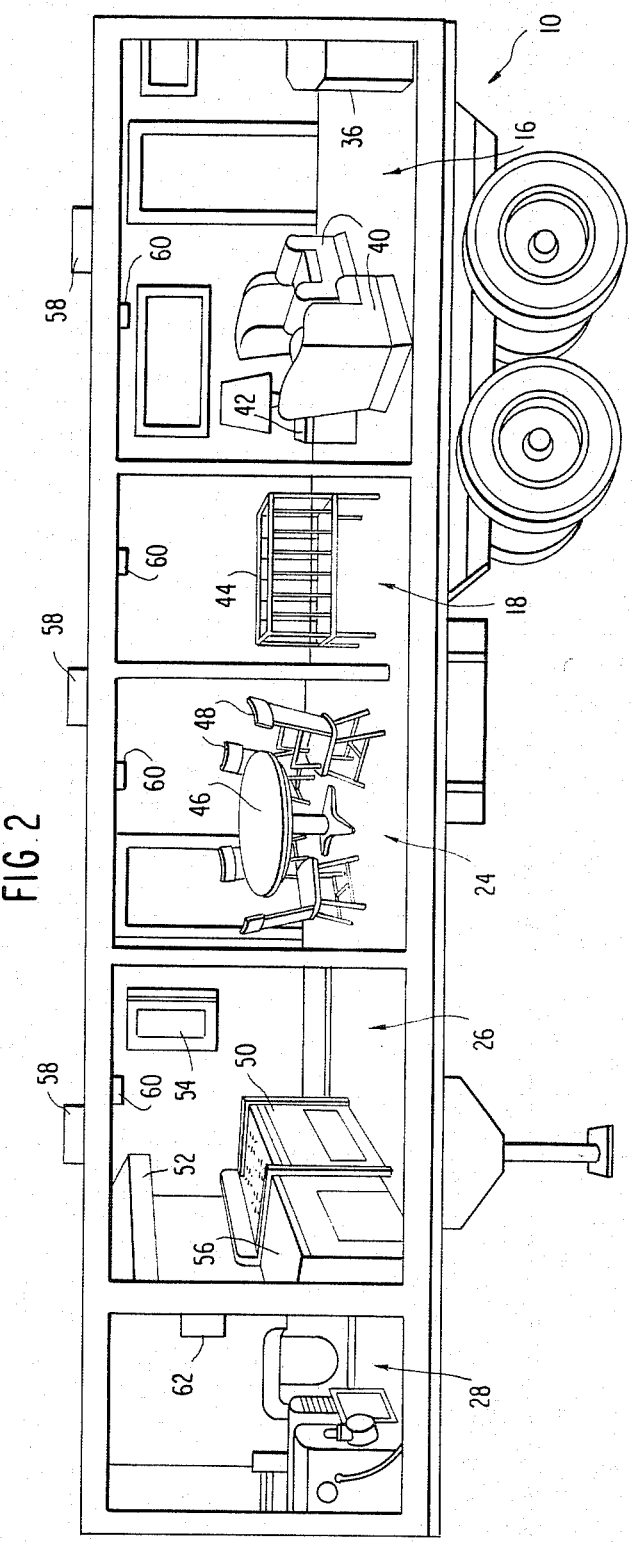
FIG. 1
FIG. 2

MOBILE FIREFIGHTER TRAINING EQUIPMENT

BACKGROUND OF THE INVENTION

The present invention is directed to mobile firefighter training equipment, and more specifically to a trailer-type vehicle having a plurality of built-in rooms containing common firesource devices, such as a kitchen range, an electrical panel, a fireplace, and the like, as well as means for generating flames, smoke, heat and sounds to provide a realistic firefighter training environment.

The most common firefighter training facility in existence today is generally a permanent tower-type structure having a plurality of floors each having one or more rooms thereon with means for generating flames and smoke to provide a realistic environment for training firefighters. Such towers usually include simulated fire sources so that the firefighter trainee will learn how to handle different types of fires in a building structure. While such facilities are generally effective, they are very expensive and are generally only available to large city fire departments.

The rural and semi-rural volunteer fire departments generally are unable to afford the sophisticated firefighter training equipment described above, and generally rely upon the controlled burning of abandoned houses or other structures in order to give the trainees some experience in fighting fires in a smoke and heat filled environment. However, such fires sometimes tend to be too realistic and present far too many unnecessary dangers to the trainee, such as sudden backdraughts, or the collapse of the structure.

SUMMARY OF THE INVENTION

The present invention provides a new and improved firefighter training facility which is relatively inexpensive, mobile, and safe while still providing a realistic environment for the training of firefighters.

The present invention provides a new and improved firefighter training facility in the form of a trailer-type vehicle which may be transported from one location to the other to train the personnel of scattered rural or semi-rural fire departments. The trailer-type vehicle is fitted out with a number of rooms similar to those found in the average home and containing the usual fixtures or appliances generally associated with home fires such as kitchen ranges with hoods, clothes dryers, electrical panels, fireplaces and the like. The various fixtures or appliances are fitted with means for producing real flames on a limited scale and additional means are provided for producing smoke which may be selectively directed in varying amounts to different portions of the trailer-type vehicle. Additional heat producing means in the form of heated walls and doors may also be provided to create a realistic, yet relatively safe, environment for a firefighter trainee. In order to enhance the safety factor, a sprinkler system, as well as an emergency ventilation system, may be provided should the flames get out of control or the trainee have difficulty with his breathing apparatus. The smoke generator, flame generators, heating panels, sound effect devices, sprinkler system, ventilation system, and the like may be controlled from a common station at one end of the trailer or from a remote control panel so that the training exercise may be completely monitored in an efficient and safe manner at all times during a training exercise.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a schematic floor plan for a mobile firefighter training trailer.

FIG. 2 is a side elevation view, partly in section, of a training trailer arranged according to the floor plan shown in FIG. 1.

DETAILED DESCRIPTION OF THE INVENTION

Figure 3:
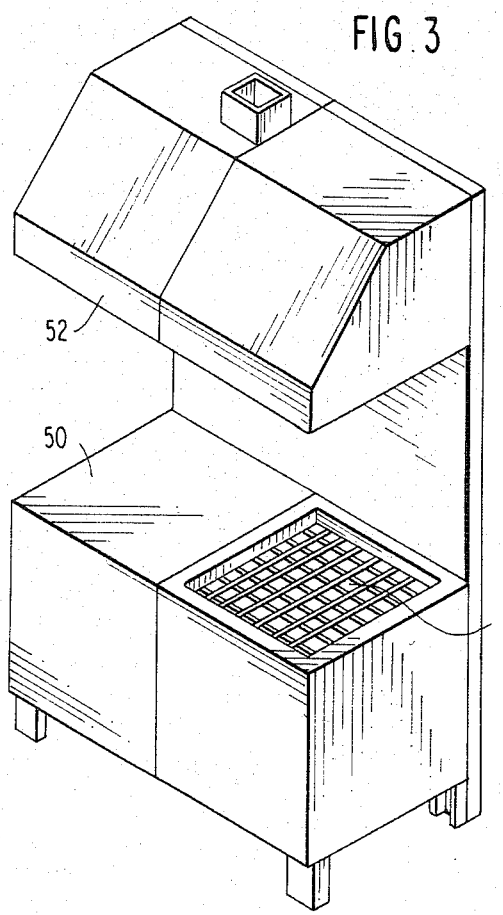
FIG. 3 is a perspective view of a simulated kitchen range having a deep fat fryer and exhaust hood.

The trailer 10, shown in FIGS. 1 and 2, is a conventional double axle trailer of the type adapted to be connected to a truck cab by means of a fifth wheel connection. The interior of the trailer is divided into a number of rooms which would simulate, on a reduced scale, the rooms found in a conventional apartment or home. A door 12 is provided in the rear of the trailer which leads into a hall 14 extending slightly more than half the length of the trailer along the wall thereof. A living room 16 is located off the hall adjacent the rear of the trailer and the entrance to the room is merely an open passage. Moving forwardly towards the front of the trailer, the next room is a simulated bedroom or nursery 18, having two doorways leading thereto. The doorway leading from the hall 14 is provided with a door 20 and another door 22 is provided in the wall separating the bedroom 18 from a dining room 24. The dining room 24 is also provided with a doorway leading into the hall 14 and a forwardly opening doorway leading to a kitchen-utility room 26. At the forwardmost end of the trailer is an equipment room 28 containing a smoke generator 30, a supply tank 32 adapted to contain the artificial smoke chemical, and a fuel tank 34 adapted to contain the fuel for running the smoke generator and the fuel for the various flame generators which will be discussed in detail hereinafter. A separate outside door 36 provides access to the equipment room.

The various rooms in the trailer may be furnished with real or simulated furniture appropriate for that particular room. For example, the living room may be furnished with a TV 36, sofa 38, two chairs 40, and a table 42. Since numerous fires occur as a result of cigarettes falling between the cushions of upholstered furniture, the sofa and chairs could be provided with smoke and flame generators of the type which will be described hereinafter. While real upholstered furniture could be utilized, the procurement and subsequent disposal problems might be considerable and simulated non-combustible pieces of furniture would be preferrable. Likewise, since TV sets are frequently a source of fire, the simulated TV set 36 could also be provided with smoke and flame generators.

Bedrooms are also a frequent source of fire, especially from people smoking in bed or children playing with matches. Thus, the bedroom 18 could be provided with a simulated bed or crib 44 which could also be supplied with smoke and flame generators.

The dining room 24 could be provided with a table 46 and chairs 48. Since the dining area is seldom the source of home fires, the real or simulated table and chairs could be situated primarily to provide obstacles for trainees operating in a smoke filled environment, as will be discussed hereinafter.

Finally, the kitchen-utility room 26 in which a very large percentage of fires originate, is provided with simulated equipment of the type which provide the greatest hazard. A simulated kitchen range 50 is provided with a hood 52, both of which are provided with suitable smoke and fire generator means. An electrical panel 54 provided on one wall and a clothes dryer 56 are also provided with suitable smoke and flame generating means.

Dense smoke is considered a major parameter in effective firefighter training. Smoke inhalation is by far the greatest cause of death in any fire situation, and firefighters must learn to operate effectively in a smoke filled environment during rescue and firefighting operations. For this reason, the primary piece of equipment in the training trailer is the smoke generator 30, which can provide a supply of dense smoke in varying degrees to different areas of the trailer. The trailer is provided with numerous rooms, doors and passageways filled with furniture-type obstacles which would frequently be encountered by a fireman during real-life fire situations. In this way, a fireman can readily learn the most effective and safe manner of proceeding through a labyrinth of smoke filled rooms and passages to carry out a search and rescue mission and to reach the source of the fire.

Various heating means (not shown) can be provided in various walls and doors to enhance the realism of the situation and to train the firefighter with regard to whether or not it is safe to open a closed door based upon the temperature of the door.

The smoke can be generated by introducing butylated triphenol phosphate (CHEM CHEX 220) into a hot air stream. Smoke generators are generally old and well known in the art, as evidenced by the U.S. Patent to Swiatosz, No. 4,303,397, granted December 1, 1981. Smoke generators are preferably electric motor operated in order to reduce the noise level and may incorporate propane fire combustion chambers or electrical resistance heaters to heat the air stream. To insure optimum smoke particulate size, automatic temperature control means are provided which maintain a set hot air stream temperature within plus or minus 10° F. at the point where the butylated triphenol phosphate is mixed with the hot air. Each smoke generator should be designed to shut down automatically whenever the temperature inside that generator exceeds a safe operating level, and in the case of the propane heater, whenever the propane gas level reaches ten percent of the lower explosive limit of propane. Smoke generators should be designed so as to not start if the butylated triphenol phosphate level is low or if any unsafe condition exists. The smoke may be distributed and dispersed throughout the training trailer through appropiate piping and control valves which are not shown in the present application. The piping may run along the ceiling, walls, or floors of the trailer to the appropriate simulated appliance or piece of furniture. As a safety precaution a number of ventilators 58 are mounted along the ceiling of the trailer at various locations so that the smoke may be quickly exhausted from the trailer in an emergency situation. Likewise, a plurality of sprinkler heads 60 may be provided in the various rooms and passages of the trailer should the fire get out of control in any manner whatsoever. The smoke generators 30, the ventilators 58, the sprinklers 60, and the flame generators associated with various appliances which will be described hereinafter, are all operable at a common control panel 62 which may be located in the equipment room 28 or any other suitable location in the interior or on the exterior of the trailer. In addition to the central control panel 62, a central remote control portable panel may be provided for controlling all of the aforementioned elements.

Fires are classified according to types. A Class A fire generally involves the combustion of ordinary materials such as paper, mattresses, trash and the like. Class B fires include grease and oil based fires; and Class C fires are fires associated with electrical motors, electronic equipment, electrical panels and the like. Thus, the training trailer is provided with simulated training fires of the three different classes. FIG. 3 is a schematic illustration of a typical kitchen range having a deep fat fryer and an overhead ventilation hood, both of which are common sources of Class B fires. Suitable automatic valve control piping from the smoke generator 30 can be led to the hood and the range and suitable automatic flame producing means are also located in the range in the vicinity of the deep fat fryer 51 and the ventilation hood 52. The provision of such smoke and flame generators is also old and well known in the art, as evidenced by the U.S. Patent to Swiatosz et al, No. 4,299,579, granted November 10, 1981.

Figure 4:
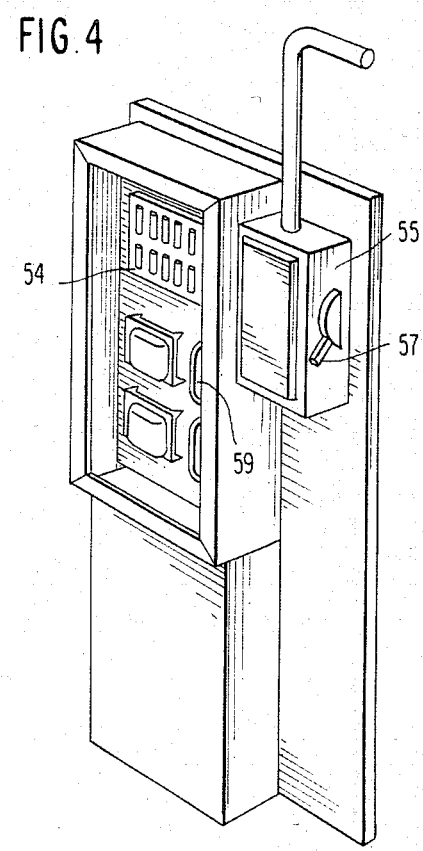
FIG. 4 is a perspective view of a simulated electrical panel.

The electrical panel 54 is shown in detail in FIG. 4. A control switch means 55 having an operating handle 57 is mounted adjacent the electrical panel and it is necessary for the firefighter trainee to operate the handle 57, which in real life would cut off the power to the electrical panel 54. In the training device, the operation of the control handle 57 would prevent the flame generator 59 from reigniting after the fire was put out in the first place. Thus, if a trainee fails to operate the switch which would disconnect the electrical power, the fire would reignite within a few seconds.

Figure 5:
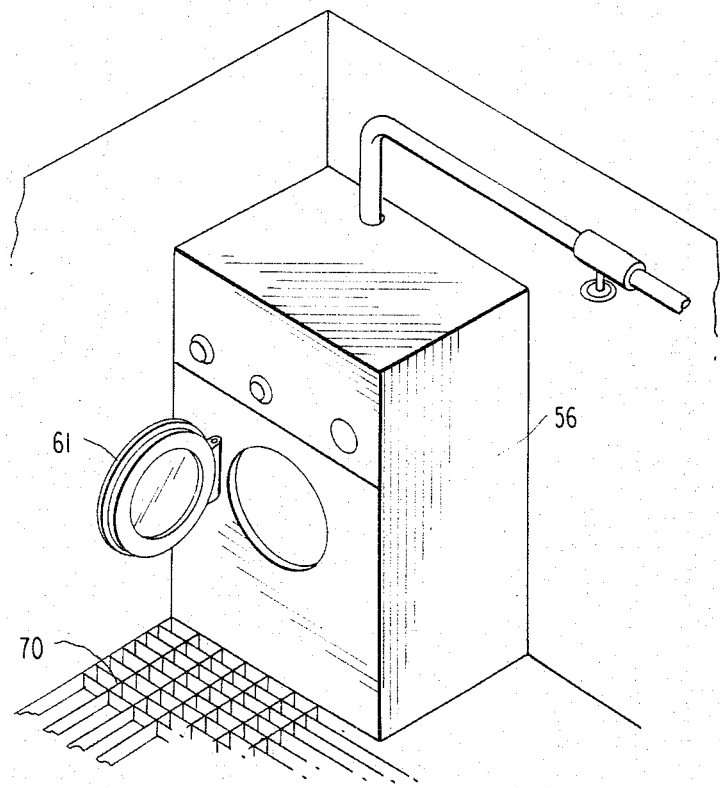
FIG. 5 is a perspective view of a simulated clothes dryer as mounted in the trailer of FIGS. 1 and 2.

A simulated clothes dryer 56 is illustrated in FIG. 5 and is capable of producing a simulated Class A fire. Smoke is initiated and terminated by the instructor, and emmanates from the simulated structure 56 in the proper sequence. The fire starts as smoke which will appear to escape around the closed dryer door 61. The heat will radiate from the dryer and when the door is opened, flames can flash through the opening and extend as far as two feet beyond the dryer. The fire responds to water as the extinguishing agent, with a bell sounding if power is not secured prior to the application of water. The bell shall cease when the power is secured. The dryer door will be functional, and when opened ignite the main flame from burning pilot.

The kitchen-utility room 26 of the trailer is provided with a false floor spaced above the main floor of the trailer which is in the form of a 1.5 inch grating 70. Thus, any water or any other fire extinguishing agent applied to the simulated fires can drain downwardly through the grating. Suitable detector means may be provided below the grating to measure the amount of water applied to the fire to determine if sufficient water or the like has been applied to properly put out the fire. If smoke and flame generators are utilized with simulated furniture in any other rooms of the trailer, the floor of that particular room would also be provided with a similar grating arrangement. In addition to the equipment previously noted with respect to the living room 16, it would be possible to provide a simulated fireplace, since fireplaces are a frequent source of home fires. Suitable ventilation means (not shown) are also provided, and can be connected to a suitable alarm so that if the trainee fails to vent the fire, or cut off the electrical power to any particular appliance involved in the fire, an appropriate alarm will sound. The progress of the trainee through the trailer can be monitored by any suitable means such as pressure detectors associated with the floor of each room or passage, and all of the fire and smoke generator means, as well as the safety features such as the ventilation system and the sprinkler system, are under the immediate control of a supervisor should any emergency arise. The supervisor is also capable of sequencing the smoke and flames for the various simulated appliances and furniture pieces in any desired manner.

While the invention has been particularly shown and described with reference to a preferred embodiment thereof, it will be understood by those in the art that various changes in form and details can be made therein without departing from the spirit and scope of the invention.

What is claimed is:

1. A mobile firefighter training trailer comprising a substantially rectangular trailer body, partition means dividing the interior of said trailer body into a plurality of rooms and passages, a plurality of simulated appliances and furniture pieces located in said trailer, smoke generating means for generating and effectively distributing smoke to said simulated appliances and furniture pieces, flame generating means associated with said simulated appliances and furniture pieces and central control means for selectively controlling the operation of said flame generating means and the distribution of smoke from said smoke generator means.

2. A mobile firefighter training trailer as set forth in claim 1 further comprising ventilation means operable to remove smoke from said trailer, said ventilation means being operable under the control of said central control means.

3. A mobile firefighter training trailer as set forth in claim 1 further comprising sprinkler means located in said trailer and operable under the control of said central control means.

4. A mobile firefighter training trailer as set forth in claim 1 wherein said simulated appliances include a simulated kitchen range having deep fryer unit, a ventilation hood above said range, a clothes dryer, and an electrical panel.

* * * * *